US012740511B2

(12) United States Patent
Kriesels et al.

(10) Patent No.: US 12,740,511 B2
(45) Date of Patent: Sep. 22, 2026

(54) HARVESTER FOR BROCCOLI

(71) Applicant: Hack Harvest B.V., Kruisland (NL)

(72) Inventors: Petrus Johannes Maria Kriesels, Kruisland (NL); Wilhelmus Cornelis Elisabeth Hack, Kruisland (NL)

(73) Assignee: Hack Harvest B.V., Kruisland (NL)

( * ) Notice: Subject to any disclaimer, the term of this patent is extended or adjusted under 35 U.S.C. 154(b) by 427 days.

(21) Appl. No.: 18/332,576

(22) Filed: Jun. 9, 2023

(65) Prior Publication Data

US 2023/0329145 A1 Oct. 19, 2023

Related U.S. Application Data

(63) Continuation of application No. PCT/NL2021/050667, filed on Nov. 1, 2021.

(30) Foreign Application Priority Data

Jan. 13, 2021 (NL) ..................................... 2027305

(51) Int. Cl.
*A01D 45/26* (2006.01)
*A01D 45/00* (2018.01)

(52) U.S. Cl.
CPC ............. *A01D 45/26* (2013.01); *A01D 45/00* (2013.01)

(58) Field of Classification Search
CPC ........ A01D 34/66; A01D 45/00; A01D 57/00; A01D 45/26; A01D 45/263; A01D 45/266
See application file for complete search history.

(56) References Cited

U.S. PATENT DOCUMENTS 3,931,859 A * 1/1976 van der Lely ......... A01B 49/00 56/2
7,047,717 B1 * 5/2006 Wolters ................ A01D 45/021 56/60

(Continued)

FOREIGN PATENT DOCUMENTS

DE 4232924 A1 3/1994
EP 3135094 A1 3/2017

(Continued)

*Primary Examiner* — Brad Harcourt
(74) *Attorney, Agent, or Firm* — Peacock Law P.C.; Justin R. Muehlmeyer; Daniel J. Berenger-Russell

(57) ABSTRACT

A harvester for broccoli which is movable along a plant row of broccoli, the broccoli comprising a stem rising up from the ground and a head on top of the stem. The harvester includes a first wheel and a second wheel, which wheels cooperate and are generally horizontally oriented with reference to the ground from which the broccoli is standing up and from which the broccoli is to be harvested. The first and second wheels are each rotatable around a vertical axis and define a path for the stems of the broccoli to pass through at least in part. The first and second wheels are arranged on different altitudes with reference to the ground so that the first and second wheels partly overlap, and each of the first and second wheels comprises fingers protruding away from the vertical axis of the wheels so that the fingers of the first wheel during rotation of the first wheel point towards the second wheel and the fingers of the second wheel during rotation of the second wheel point towards the first wheel completely cross the path defined by the first and second wheels so as to provide a restriction for the stems of the broccoli at least partially passing the path.

7 Claims, 1 Drawing Sheet

(56) References Cited

U.S. PATENT DOCUMENTS

| | | | | |
|---|---|---|---|---|
| 8,136,335 | B2 | 3/2012 | Dobson | |
| 8,578,689 | B2 * | 11/2013 | Luetke-Harmann | G01N 29/043 56/119 |
| 10,238,032 | B2 * | 3/2019 | Missotten | A01D 34/015 |
| 2014/0059994 | A1 | 3/2014 | Surmann et al. | |

FOREIGN PATENT DOCUMENTS

| | | | |
|---|---|---|---|
| NL | 1026790 | C1 | 2/2006 |
| RU | 2013038 | C1 | 5/1994 |
| WO | 2022154655 | A1 | 7/2022 |

* cited by examiner

HARVESTER FOR BROCCOLI

CROSS-REFERENCE TO RELATED APPLICATIONS

This application is a continuation of International Patent Application No. PCT/NL2021/050667, titled "A Harvester for Broccoli", filed on Nov. 1, 2021, which claims priority to and the benefit of Netherlands Patent Application No. 2027305, titled "A Harvester for Broccoli", filed on Jan. 13, 2021, and the specification and claims thereof are incorporated herein by reference.

BACKGROUND OF THE INVENTION

Field of the Invention

The invention relates to a harvester for broccoli which is movable along a plant row of broccoli, said broccoli comprising a stem and a head on top of the stem, and said harvester comprising cooperating first and second wheels that are generally horizontally oriented with reference to the ground from which the broccoli is standing up and from which the broccoli is to be harvested, wherein said first and second wheels are each rotatable around a vertical axis, wherein said first and second wheels define a path for the stems of the broccoli to pass at least in part.

Background Art

U.S. Pat. No. 8,136,335 discloses a harvester which is generally intended for harvesting of brassicas, for example broccoli. The known harvester is designed to be towed behind a prime mover, such as a tractor, and comprises a pair of alignment wheels each rotatable about a vertical axis and thereby in a horizontal plane. The wheels are arranged relatively close to the surface of the bed in which the brassicas is growing, and are spaced apart laterally so that the adjacent circumferences of the two wheels define a passage which narrows significantly from the forward end of the two wheels to a throat between the two wheels. As the plants enter the passage between the two wheels, and pass through the passage as a result of the advance of the harvester along the crop bed, the wheels straighten the stems to an approximately vertical position and also ensure that the stems are located approximately on the central longitudinal axis between the two wheels. A rotary cutter in the form of a toothed cutting disc is mounted to the support structure of one of the wheels to cut through the stem of the brassicas. The cutter is therefore of a diameter substantially larger than that of its associated wheel and its forward cutting edge extends across the central longitudinal axis behind the throat of the two wheels. During cutting of the stems by the cutter, the head of the plant is held by cooperating curved fingers above the wheels and the cutter.

One of the disadvantages of the harvester that is known from U.S. Pat. No. 8,136,335 is its complicated construction, and in accordance there with the sensitive joint operation of the respective parts, to note the cooperation of the wheels, the cutter, and the cooperating curved fingers that are placed above the wheels and cutter.

RU 2 013 038 discloses a machine, with a working body that contains a device for lifting heads of cabbage, a pair of supports on which a cutting device and a clamping element are fixed. The cutting device is made in the form of kinematically connected gear wheels fixed on each support and a circular knife mounted on at least one of the supports above the end surface of a toothed wheel. The diameter of the latter is greater than the diameter of the gear.

References are discussed in this application to give a more complete background and shall not be interpreted as an admission that such references are prior art for purposes of determining patentability of the present invention.

BRIEF SUMMARY OF THE INVENTION

It is an object of the embodiments of the present invention to simplify traditional harvesters, reduce costs, and to improve operational reliability of harvesters.

A harvester according to an embodiment of the present invention is described with the features set forth in one or more of the appended claims.

In a first aspect of the invention, a harvester for broccoli is proposed with the features of claim 1.

A harvester according to an embodiment of the present invention comprises first and second wheels arranged on different altitudes with reference to the ground so that the first and second wheels partly overlap, and each of the first and second wheels comprises fingers protruding away from the vertical axis of the wheels so that the fingers of the first wheel that during rotation of the first wheel point towards the second wheel and the fingers of the second wheel that during rotation of the second wheel point towards the first wheel completely cross the path defined by the first and second wheels so as to provide a restriction for the stems of the broccoli at least partially passing said path, wherein the respective fingers of the first and second wheels are arcuate shaped, such that the fingers are bent and have their pointy extremity which is pointing away from the vertical axis directed forwards and leading in the respective directions of rotation of the first and second wheels. This relatively simple construction satisfies the requirements for effectively harvesting the upstanding broccoli, wherein the restriction for the stems of the broccoli effectively serves as a cutting instrument to detach the broccoli from the ground that it is standing in/on. It is noted that although the first and second wheels are at different altitudes with reference to the ground, they are preferably in close vicinity of each other to support the effective cutting of the stems that the fingers of the wheels provide.

It is usual practice that during use the first and second wheels rotate synchronously in opposite directions. It is preferable that while the first and second wheels rotate, their respective fingers, while pointing from one of the wheels to the other of the wheels, move along the path defined by the first and second wheels. This movement of the fingers supports the effective cutting through of the stems of the broccoli. It is further preferred that in the path defined by the first and second wheels, the wheels and their respective fingers define an open area with a shape and with dimensions that vary during rotation of the first and second wheels, wherein eventually while the fingers during rotation of the reels progress along the path defined by the first and second wheels, the open area vanishes so as to arrange that edges of the fingers cut through the stem of the broccoli.

Advantageously for an effective cutting operation it is desirable that the fingers have sharp cutting edges.

To reduce manual labour as much as possible, it is preferred that trailing to the first and second wheels a conveyor for the cut off broccoli is provided to collect and further transport the harvested broccoli.

Effective operation of the harvester of the invention is envisaged by arranging that the harvester is mountable in front of a prime mover, such as a tractor.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figures 1, 2, 3, 4:
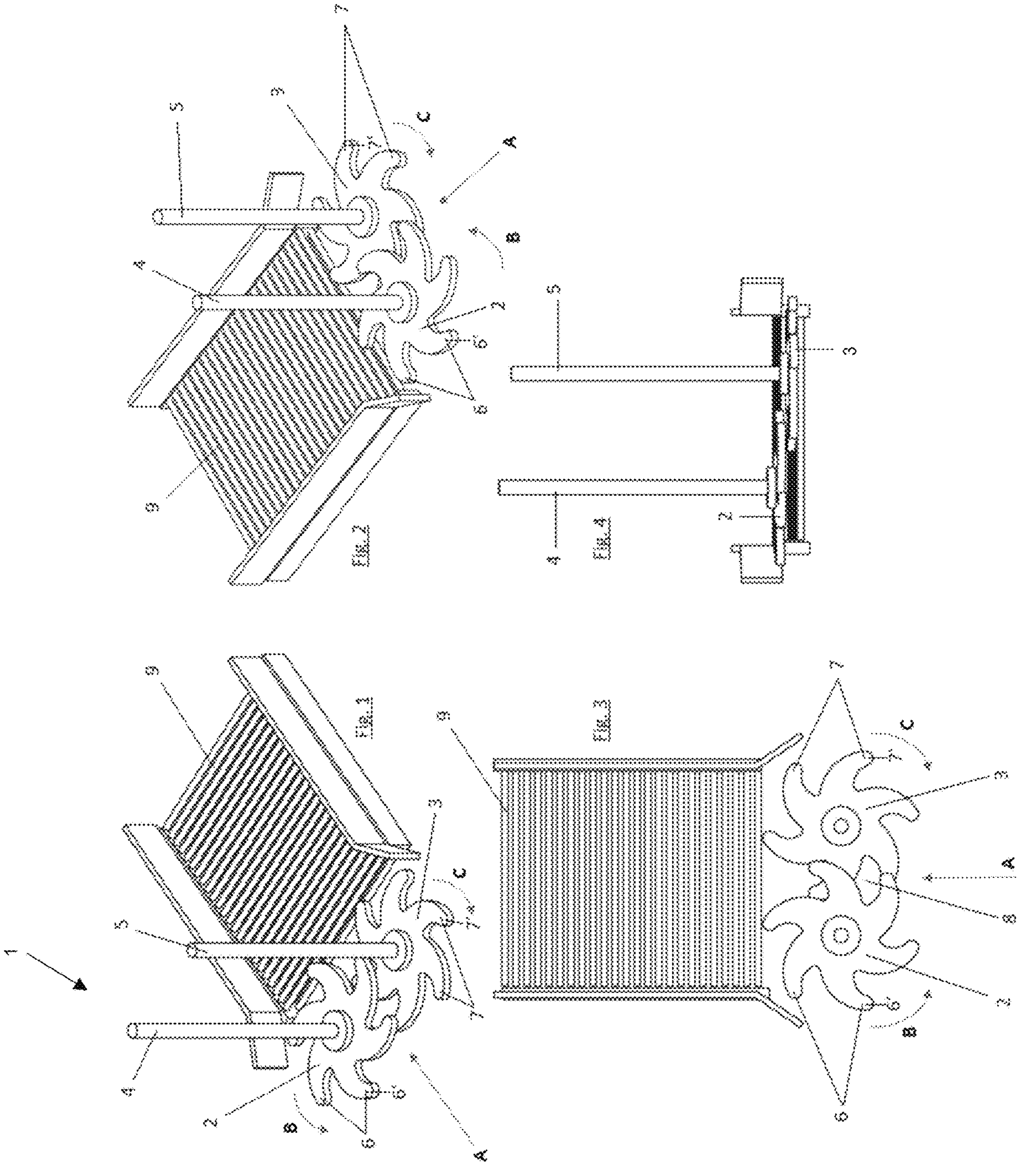
FIGS. 1 and 2 are illustrations showing oblique isometric views from the right and left, respectively, of a harvester according to an embodiment of the present invention.
FIG. 3 is an illustration showing a view from above of a harvester according to an embodiment of the present invention.
FIG. 4 is an illustration showing a frontal view of a harvester according to an embodiment of the present invention.

Whenever in the figures the same reference numerals are applied, these numerals refer to the same parts.

It is remarked that for clarity sake that the figures show only one embodiment of the present invention. In operation the harvester as shown in the figures is preferably to be mounted in front of a prime mover, such as a tractor. It is not necessary to show this in the figures, since this manner of mounting a harvester is generally known to the skilled person and therefore requires no further elucidation.

What the figures show is indeed the core of a harvester 1 for broccoli which is movable along a plant row of broccoli. As the skilled person knows broccoli comprises a stem and a head on top of the stem.

Harvester 1 according to an embodiment of the present invention comprises first wheel 2 and second wheel 3 that cooperate with each other and that are generally horizontally oriented with reference to the ground from which the broccoli is to be harvested. First wheel 2 and second wheel 3 are each rotatable around vertical axis 4, 5. Further first and second wheels 2, 3 define path A for the stems of the broccoli to pass through at least in part.

FIG. 4 shows that first wheel 2 and second wheel 3 are arranged on different altitudes with reference to the ground so that first and second wheels 2, 3 partly overlap. Particularly in FIGS. 1-3 it is shown that each of first and second wheels 2, 3 comprises fingers 6, 7 protruding away from respective vertical axes 4, 5 of wheels 2, 3 so that fingers 6 of first wheel 2 that point towards the second wheel 3, and fingers 7 of second wheel 3 that point towards first wheel 2 cross the path defined by first and second wheels 2, 3 completely so as to provide a restriction for the stems of the broccoli at least partially passing said path.

During use, first and second wheels 2, 3 rotate synchronously in opposite directions B and C, respectively. While first and second wheels 2, 3 rotate, their respective fingers 6, 7, while pointing from one of the wheels to the other of the wheels, move along path A defined by first and second wheels 2, 3 thus forming a restriction for the stems of the broccoli.

As may be best seen in FIGS. 1-3, the respective fingers 6, 7 of first and second wheels 2, 3 are arcuate shaped, such that fingers 6, 7 are bent and have their pointy extremity 6', 7' which is distant and pointing away from vertical axis 4, 5 directed forwards and leading in the respective directions B, C of rotation of first and second wheels 2, 3.

It is further shown that in path A defined by first and second wheels 2, 3, the wheels and their respective fingers 6, 7 define open area 8 with a shape and with dimensions that vary due to the rotation of first and second wheels 2, 3. While during rotation of wheels 2, 3 fingers 6, 7 progress along path A defined by first and second wheels 2, 3, open area 8 thus eventually vanishes so as to arrange that edges of the fingers 6, 7 cut through the stem of the broccoli. To that end it is preferred that fingers 6, 7 have sharp cutting edges.

Finally FIGS. 1-3 show that that trailing to first and second wheels 2, 3 is conveyor 9 for collection of the cut off broccoli.

Although the invention has been discussed in the foregoing with reference to an exemplary embodiment of the harvester of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

What is claimed is:

1. A harvester for broccoli which is movable along a plant row of broccoli, the broccoli comprising a stem rising up from the ground and a head on top of the stem, the harvester comprising:

a first wheel and a second wheel, which wheels are cooperating and are generally horizontally oriented with reference to the ground from which the broccoli is standing up and from which the broccoli is to be harvested, wherein the first and second wheels are each rotatable around a vertical axis, and the first and second wheels define a path for the stems of the broccoli to pass through at least in part, wherein the first and second wheels are arranged on different altitudes with reference to the ground so that the first and second wheels at least partly overlap, and that each of the first and second wheels comprises fingers protruding away from the vertical axis of the wheels so that the fingers of the first wheel point towards the second wheel at least at some moment during rotation of the first wheel, and the fingers of the second wheel point towards the first wheel at least at some moment during rotation of the second wheel, and completely cross the path defined by the first and second wheels so as to provide a restriction for the stems of the broccoli at least partially passing the path, wherein the respective fingers of the first and second wheels each comprise:

a leading edge and a trailing edge, wherein the leading edge comprises a substantially concave shape with respect to the direction of rotation of the first and second wheels, wherein the trailing edge comprises a substantially convex shape with respect to the direction of rotation of the first and second wheels, wherein the leading edge and trailing edge converge at the extremity of their respective finger, and wherein the extremity is directed away from the vertical axis, directed forwards and leading in the respective directions of rotation of the first and second wheels.

2. The harvester of claim 1, wherein during use the first and second wheels rotate synchronously in opposite directions, and that while the first and second wheels rotate, their respective fingers, while pointing from one of the wheels to the other of the wheels, move along the path defined by the first and second wheels.

3. The harvester of claim 1, wherein, in the path defined by the first and second wheels, the wheels and their respective fingers define an open area with a shape and with dimensions that vary during rotation of the first and second wheels, wherein eventually while the fingers progress along the path defined by the first and second wheels, the open area vanishes so as to arrange that edges of the fingers cut through the stem of the broccoli.

4. The harvester of claim 1, wherein the fingers comprise sharp cutting edges.

5. The harvester of claim 1, further comprising a conveyor for the cut off broccoli trailing the first and second wheels.

6. The harvester of claim 1, wherein the harvester is mountable in front of a prime mover.

7. The harvester of claim 1, wherein the prime mover is a tractor.

* * * * *